Sept. 21, 1948. D. F. WILCOCK 2,449,574
LUBRICATED BEARING
Filed Jan. 28, 1947
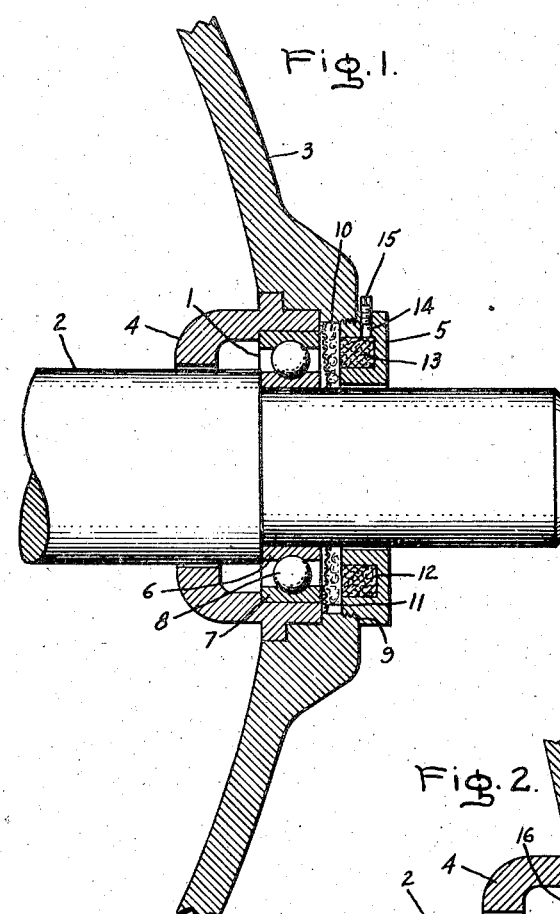
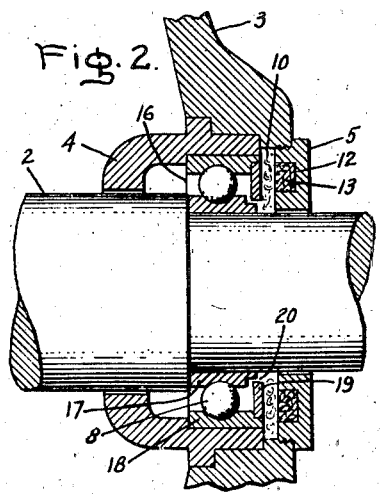
Inventor:
Donald F. Wilcock,
by Prowell F. Mack
His Attorney.

Patented Sept. 21, 1948

2,449,574

UNITED STATES PATENT OFFICE 2,449,574

LUBRICATED BEARING

Donald F. Wilcock, Marblehead, Mass., assignor to General Electric Company, a corporation of New York Application January 28, 1947, Serial No. 724,827

6 Claims. (Cl. 308—187)

My invention relates to rotating machines, and more specifically to an improved bearing lubrication arrangement for such machines.

In rotating machines, lubrication of antifriction bearings of either the ball or roller type has long presented vexing problems. Heretofore, such bearings have been lubricated either by the use of oil, as such, or by the use of grease acting as an oil vehicle. Since free oil will not stay within the bearing unit, oil lubrication presents the problem of adding cumbersome and costly apparatus to supply a stream, spray or mist of oil. On the other hand, lubrication which uses grease, to release or bleed into the bearing oil contained in said grease, is successful for only relatively short periods. After a time, the length of which is dependent upon such conditions as temperature to which the grease is subjected, amount of grease available and rate of bleeding, the grease can no longer furnish oil to the bearing and the bearing fails for lack of lubrication. This failure may occur even though grease at some distance from the bearing still contains almost its original content of oil. This is so because the oil will not feed to the bearing through too great a thickness of grease and because the grease near the bearing, due to heat and to the exhaustion of its oil supply, becomes horny and impervious to the further passage of oil.

It is an object of my invention to provide simple and inexpensive means for overcoming these difficulties.

In the illustrated embodiment of my invention the means employed in this connection comprises a thin layer of grease next to the bearing in combination with an oil wick, acting to replenish the oil in the grease. The oil wick prolongs the lubricated life of the bearing by increasing the supply of available oil, and at the same time all of the advantages of grease lubrication are retained, the grease acting as a valve to feed oil to the bearing at only a moderate rate.

Other aspects of the invention will appear from consideration of the following description taken in connection with the accompanying drawing.

In the drawing Fig. 1 represents an embodiment of my invention and Fig. 2 shows a modification thereof. Like parts are similarly numbered in the two figures.

I have shown in Fig. 1 the embodiment of my invention in connection with an antifriction bearing unit such as ball bearing unit 1 supporting a rotatable shaft 2 which is assumed to be attached to a rotatable member (not shown) of an electrodynamic machine having a stationary end bell 3 in which is mounted an annular bearing housing 4 and an annular end cap 5.

Bearing unit 1 comprises an inner race 6, which is pressed onto shaft 2 and rotates with it, and an outer race 7 which is fitted into a recess provided therefor in housing 4. Said inner and outer races are provided with registering grooves and seated therein so as to be interposed between said races are a plurality of antifriction bearing elements 8. In the embodiment illustrated end cap 5 is threaded into end bell 3 and is provided with a shoulder 9 which, after a predetermined inner travel, prevents further travel when said end cap is threaded into said end bell. Thus, walls are provided defining an enclosure between bearing unit 1 and said end cap. This space is occupied by a lubricating grease 10 and by an annular mesh screen 11. Other porous means may be used instead of screen 11 to prevent the passage of grease into bearing unit 1.

The inner face of end cap 5 is provided with an annular groove or recess 12. At the time of assembly, an oil wick 13 is placed in said recess. Oil wick 13 is a packing of wool waste, wool felt, or other suitable material. End cap 5 may optionally be provided with an oil filler opening 14, so that oil may be added to the wick, and with an oil plug 15 to seal said opening. Of course, if the optional feature of oil filler opening 14 is not provided, oil wick 13 must be saturated with oil at the time of assembly.

I have shown in Fig. 2 a modification in which a ball bearing unit 16, of the type conventionally known as a single shielded ball bearing, is used. Bearing unit 16 is furnished with an annular notched inner race 17 and an annular outer race 18. Attached to outer race 18 is an annular shield 19 which at its inner radial limit cooperates to form a labyrinth with the notch in inner race 17. An exaggerated view is shown in the drawing but actually the clearance within the labyrinth is such that passage of grease is prevented while passage of oil is allowed. This allows the omission of such a device as wire screen 11 shown in Fig. 1. Otherwise the embodiment illustrated in Fig. 2 is substantially the same as that shown by Fig. 1.

With either embodiment the oil in wick 13 is preferably the same as the oil in the formulation of grease 10, although this is not essential. In order for the grease to effectuate the proper valving action, the layer of grease has preferably the thickness of from one-sixteenth to one-quarter inch when the parts are assembled.

Before assembly of the parts, grease is put in the space provided in an amount slightly more than enough to give the desired final thickness of the layer. Thus, it is assured that after final assembly the grease will wholly contact oil wick 13 and mesh 11 (Fig. 1) or labyrinth 20 (Fig. 2). Before initial operation of the machine, wick 13 is thoroughly saturated with oil. Thereafter grease 10 will bleed oil into the bearing unit and wick 13 will replace the oil thereby lost by the grease. With the construction described, the oil will not feed to the bearing through too great a thickness of grease and the grease will not become impervious to the passage of oil. Thus, there is provided a device of the character described which is capable of meeting the objects hereinabove set forth.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. In a machine, a rotatable shaft, an antifriction bearing unit supporting said shaft, means for supporting said bearing unit, porous means adjoining said bearing unit for permitting the passage of oil while preventing the passage of grease to said bearing unit, walls defining an enclosure about said shaft and adjoining said porous means, lubricating grease in said enclosure, a recess formed in at least one of the walls defining said enclosure, and means including an oil wick located in said recess for supplying oil to said grease.

2. In a rotating machine, a rotatable shaft, an antifriction bearing unit supporting said shaft, a housing member surrounding said bearing unit, walls defining a closure about said shaft and adjacent said bearing unit, lubricating grease located in said closure, a wire screen positioned between said grease and said bearing unit to prevent entry of grease into said bearing unit, walls defining a recess in at least one of the walls defining said closure, and an oil wick located in said recess for supplying oil to said grease.

3. In machine, a rotatable shaft, an inner bearing race affixed to said shaft, an outer bearing race, a plurality of antifriction bearing elements interpositioned between said inner bearing race and said outer bearing race, a stationary housing for said outer bearing race, means adjacent one side of said bearing races for preventing the passage of grease to said antifriction bearing elements while allowing the passage of oil thereto, walls which with said means define an enclosure on the opposite side of said means from said bearing races, at least one of the walls defining said enclosure being provided with an annular recess, lubricating grease located in said enclosure, an oil wick located in said recess and adapted to supply oil to said grease, and means for replenishing the oil in said oil wick.

4. The combination with a shaft of a bearing race affixed thereto, a second bearing race around the first mentioned bearing race, antifriction bearing elements interposed between said races, walls defining an enclosure about said shaft and adjacent said bearing races, means for preventing passage of grease while allowing passage of oil from said enclosure to said antifriction bearing elements, lubricating grease in said enclosure and means including an oil wick located in a recess adjacent said enclosure for supplying oil to said grease.

5. In a dynamo electric machine, a rotatable shaft, an antifriction bearing unit, a housing for said bearing unit, a perforated plate adjacent said bearing unit and for the purpose of preventing the passage of grease while allowing the passage of oil thereto, walls which with said shaft and said perforated plate define an enclosure, lubricating grease in said enclosure, a circumferential recess provided in one of the walls forming said enclosure, an oil wick located in said recess, means including a hole extending radially outward from said recess for supplying oil to said wick, whereby said bearing may be lubricated by oil bled from said grease, the oil in said grease may be replenished by oil from said wick, and the oil in said wick may be replenished from the outside.

6. In a dynamo electric machine, a rotatable shaft, a single shielded ball bearing unit supporting said shaft, walls which with said shaft and with the shielded end of said bearing unit define an enclosure, one of said walls having a circumferential recess therein, lubricating grease in said enclosure, and a packing soaked in oil located in said circumferential recess, whereby said bearing may be lubricated by oil bled from said grease and said grease may be supplied with oil from said packing.

DONALD F. WILCOCK.